United States Patent [19]

Powers

[11] 4,224,294
[45] Sep. 23, 1980

[54] PREPARATION OF SODIUM ORTHOPHOSPHATE MIXTURES

[75] Inventor: Edward J. Powers, Harrison, N.Y.

[73] Assignee: Stauffer Chemical Company, Westport, Conn.

[21] Appl. No.: 3,323

[22] Filed: Jan. 15, 1979

[51] Int. Cl.² ............................................. C01B 25/30
[52] U.S. Cl. .................................... 423/309; 423/315
[58] Field of Search .................... 423/313, 309, 315

[56] References Cited

U.S. PATENT DOCUMENTS

| | | | |
|---|---|---|---|
| 3,081,151 | 3/1963 | Marty | 423/313 |
| 3,086,844 | 4/1963 | Beltz et al. | 423/309 |
| 3,409,392 | 11/1968 | Shaver | 423/309 |
| 3,764,655 | 10/1973 | Ehlers et al. | 423/309 |
| 4,112,118 | 9/1978 | Cussons et al. | 423/313 |

FOREIGN PATENT DOCUMENTS 886217  1/1962  United Kingdom ............... 423/309

OTHER PUBLICATIONS

Hou, Manufacture of Soda, Second Edition, Reinhold Publishing Corp., (1942), p. 182.
Babor, Basic College Chemistry, Second Edition, Thomas Y. Crowell Co., (1953), pp. 255–257.

Primary Examiner—Wayne A. Langel
Attorney, Agent, or Firm—Roger S. Benjamin

[57] ABSTRACT

A mixture of disodium and monosodium orthophosphate in a 2:1 mole ratio is prepared by sequentially reacting phosphoric acid with monohydrate process soda ash and caustic soda in a semi-solid reaction medium.

Milled monohydrate process soda ash is contacted in less than stoichiometric proportions with phosphoric acid and the resultant orthophosphate containing reaction mixture is brought to a sodium to phosphorus mole ratio of about 1.67:1 by subsequent reaction with caustic soda. The final reaction product of mixed disodium and monosodium orthophosphate is suitable feedstock for conversion to sodium tripolyphosphate.

12 Claims, 1 Drawing Figure

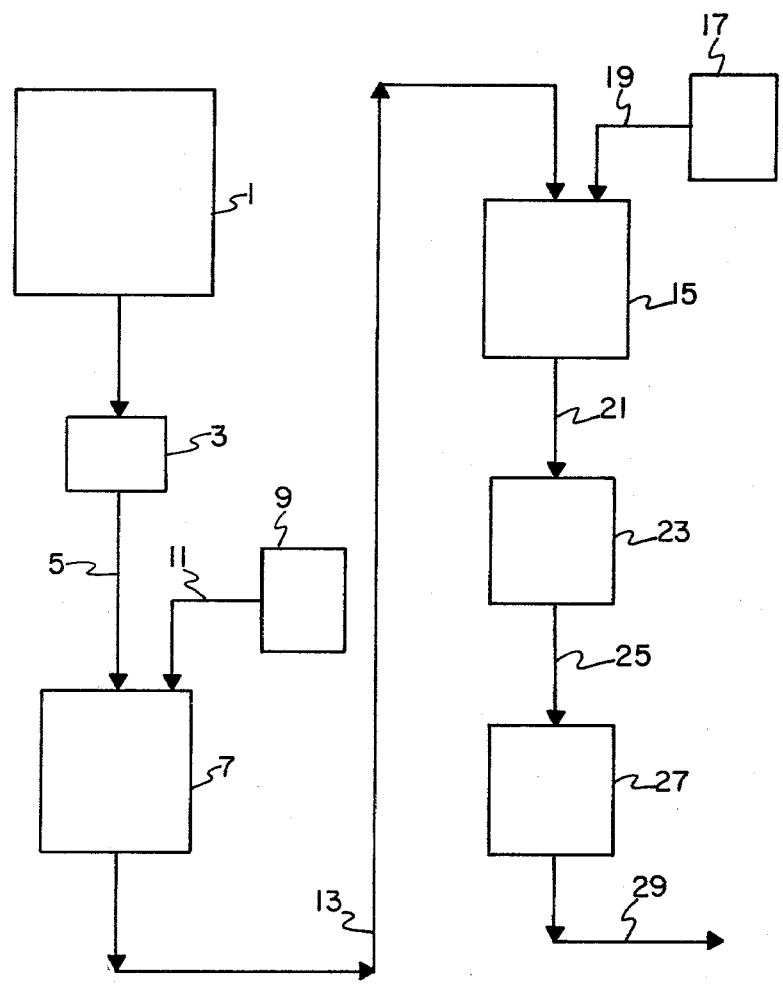

PREPARATION OF SODIUM ORTHOPHOSPHATE MIXTURES

BACKGROUND OF THE INVENTION

Sodium tripolyphosphate (STPP) is prepared from a feedstock containing disodium orthophosphate (disodium hydrogen phosphate) and monosodium orthophosphate (sodium dihydrogen phosphate) in a 2:1 mole ratio. A convenient route for the preparation of sodium orthophosphate mixtures having the required 2:1 mole ratio is the reaction of soda ash with phosphoric acid according to the equation:

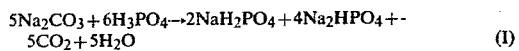

$$5Na_2CO_3 + 6H_3PO_4 \rightarrow 2NaH_2PO_4 + 4Na_2HPO_4 + 5CO_2 + 5H_2O \qquad (I)$$

It is desirable to prepare mixed monosodium and disodium orthophosphates in a medium containing a minimum of water since excess water must be removed at some expense at the conclusion of the process. "Light soda ash", a synthetic soda ash derived from the Solvay process, is highly reactive with concentrated phosphoric acid in stoichiometric proportions when contacted in a slurry reaction medium containing relatively little water. However, Solvay soda ash is not of assured future supply because of diminishing use of the Solvay process. It is necessary to develop alternate processes for the preparation of orthophosphate mixtures which are not dependent upon Solvay soda ash as a principle reactant.

Monosodium and disodium orthophosphate salt mixtures desirably have very low levels of unreacted soda ash or phosphoric acid. For example, phosphate salts for meat curing (see U.S. Pat. No. 2,513,094 to Hall) desirably have low levels of unreacted carbonate.

SUMMARY OF THE INVENTION

This invention is a process for preparing a 2 to 1 mole ratio mixture of disodium orthophosphate and monosodium orthophosphate in a semi-solid reaction medium using solid monohydrate process soda ash as a principle reactant. Moreover, the orthophosphate mixture prepared by the process of this invention has a low residual carbonate content.

Another aspect of this invention is an improved process for making sodium tripolyphosphate by calcining and tempering a mixture of sodium orthophosphates produced according to the improved process of this invention.

This invention is based upon the discovery that monohydrate process natural soda ash may be used in place of more reactive light Solvay soda ash if three essential process steps are practiced. These process steps are (1) soda ash milling, (2) incomplete reaction, and (3) caustic soda addition.

DETAILED DESCRIPTION OF THE INVENTION

Natural monohydrate process soda ash has been found to be comparatively less reactive than Solvay light ash in reaction with concentrated phosphoric acid in a semi-solid reaction medium. This lower reactivity is displayed as unreacted sodium carbonate content in the final mixed sodium orthophosphate reaction product.

It has been discovered that natural monohydrate process soda ash may be used as the sole source of sodium carbonate in the reaction described by equation (I) if the following three essential steps are sequentially practiced:

(A) The first process step is particle size reduction of solid monohydrate process soda ash before admixture and reaction with phosphoric acid.

(B) The second process step is an incomplete phosphoric acid reaction performed by contacting monohydrate process soda ash reactant directly with concentrated phosphoric acid in such proportion that the soda ash reactant provides between about 74% to about 94% of the stoichiometric sodium carbonate requirements of the reaction represented by equation (I).

(C) The third process step completes the sodium orthophate salt mixture formation by uniformly mixing caustic soda with the second step soda ash/phosphoric acid reaction product in a semi-solid reaction medium to give a final reaction mixture having a sodium to phosphorus mole ratio of about 1.67:1.

Soda ash (sodium carbonate) is available from both synthetic and natural sources. Synthetic soda ash obtained from the Solvay process is characterized as "light ash" and has a density of less than 642 kg/m$^3$. Natural soda ash derived from trona ore by the monohydrate process has a density in excess of 800 kg/cm$^3$ (see, *Encyclopedia of Chemical Technology*, monohydrate process, second edition, vol. 18, p. 464). Typically, monohydrate process soda ash is characterized by a density between about 810 to 1040 kg/m$^3$.

It is a discovery of this invention that the particle size distribution of natural monohydrate process soda ash is critical for obtaining low residual carbonate levels in the soda ash/phosphoric acid reaction product. Milling monohydrate process soda ash to the proper particle size distribution permits more complete reaction at near stoichiometric proportions (viz., above about 74%) with concentrated phosphoric acid. Specifically, it has been discovered that monohydrate process soda ash must be milled so that at least 70 weight percent passes 100 mesh and at least 50 weight percent passes 200 mesh (U.S. Standard Screen Series). Preferably, the soda ash is milled so that at least 80 weight percent passes 100 mesh, at least 60 weight percent passes 200 mesh and at least 15 weight percent passes 325 mesh. Large particles (over 30 mesh) should be substantially absent from the milled monohydrate process soda ash reactant.

Phosphoric acid (orthophosphoric acid, H$_3$PO$_4$) reactant suitable for use in the process of this invention is concentrated phosphoric acid having an H$_3$PO$_4$ concentration between about 60 to about 90 weight percent (balance consisting essentially of water). Preferred for the practice of this invention is phosphoric acid having a H$_3$PO$_4$ concentration between 75 and 87 weight percent. Phosphoric acid having a water content above 30 weight percent)—(i.e., H$_3$PO$_4$ concentration below 70 weight percent) is generally unsuitable because it necessitates an extensive water removal in the final product. Phosphoric acid having very high P$_2$O$_5$ content (e.g. superphosphoric acid) is unsuitable without separate water addition because it produces a stiff and intractable reaction product lacking sufficient mobility to permit adequate soda ash reaction.

Caustic soda (sodium hydroxide) suitable for use in the third process step may be in the form of a liquid or solid. Solid forms of caustic soda are commonly flakes or pellets. Aqueous forms of caustic soda are exemplified by solutions containing 50 to 73 weight percent caustic soda (such as commercially produced by brine electrolysis). Aqueous forms of caustic soda are particularly suitable for use in the process of this invention because of convenience, cost, and availability. The water content of the caustic soda reactant is not critical and may be adjusted to permit uniform mixing with the reaction mixture of phosphoric acid and soda ash. Desirably, the water content of the caustic soda is as low as possible to minimize drying of the final mixed orthophosphate product.

The first step of milling of monohydrate process soda ash effects the particle size reduction necessay to increase its reactivity with phosphoric acid. Particle size reduction may be accomplished by compression, impact, attrition, or cutting action. Suitable equipment include hammer mills, pin mills, ball mills and rod mills. The resultant particulate soda ash may be separated by techniques such as screening or air classification.

The second essential step is incomplete reaction of the concentrated phosphoric acid. Soda ash reactant is added to the phosphoric acid reactant in such proportion that it provides between about 74% to about 94% of the stoichiometric sodium carbonate requirements of the reaction represented by Equation (I).

Preferably, soda ash reactant is used to provide between 75 percent and 90 percent of the stoichiometric proportion needed for reaction with the phosphoric acid. Less than 74% of soda ash stoichiometric requirements necessitates overuse of caustic soda in a later process step. Caustic soda is generally of higher cost than soda ash and may introduce excessive water into the reaction mixture if employed in aqueous form. Conversely, employment of soda ash reactant in excess of 94% will generally result in reaction mixture having unacceptably high levels of unreacted sodium carbonate due to the limited reactivity of natural monohydrate process soda ash.

Milled monhohydrate process soda ash reactant is reacted with concentrated phosphoric acid by uniform mixing. Uniform mixing is accomplished by any conventional apparatus such as ribbon blenders, mixing rolls, kneaders, masticators, or agitators. The reactants may be charged to the mixing apparatus in any order, but is is preferable that the reactants be added simultaneously to promote rapid and uniform mixing.

The temperature of mixing the soda ash and phosphoric acid is not critical. The temperature of reaction is preferably above 60° C. but this is usually obtained simply by combining the reactants at near ambient temperature and depending on the exothermic nature of the reaction to give the desired temperature increase. Reaction rate (and corresponding reaction temperature) may be increased by increasing agitation in the reaction vessel or the rate of reactant addition.

The reaction environment produced by mixing solid dense natural soda ash and concentrated phosphoric acid is characterized as a semi-solid reaction medium. This semi-solid reaction medium is a multiphase environment containing liquid and solid reactants together with solid and gaseous reaction products. The semi-solid reaction medium usually has the appearance of a froth, slurry, or mobile paste.

Upon initial contact of the reactants, the reaction medium will generally comprise a froth consisting of soda ash particles, syrupy phosphoric acid, evolved carbon dioxide and steam. At a latter stage, the reaction mixture will be relatively quiescent and is essentially a slurry of unreacted soda ash particles and reaction product orthophosphates with phosphoric acid. The final reaction product may have any workable consistency but it is generally preferred that it have the consistency of a mobile paste or slurry capable of convenient transport and agitation by conventional means such as screws, buckets, slurry pumps, mixers, agitators, etc.

The fluidity of the soda ash/phosphoric acid reaction product is primarily determined by its water content. In the procedure where solid soda ash reactant (containing substantially no physically separable liquid phase) is added to concentrated phosphoric acid the fluidity of the reaction mixture is primarily determined by the water content of the phosphoric acid. Suitable reaction products are produced with phosphoric acid reactant containing about 60 to about 90 weight percent $H_3PO_4$ (the balance water).

The optimum water content of the reaction mixture is a practical determination to be made by the process operator based on the specific equipment and methods used. Too low a water content in the soda ash/phosphoric acid reaction product will result in a stiff mixture which is uneconomical to mix and encourages the presence of unreacted soda ash. Conversely, too dilute a reaction mixture will result in unnecessary drying of the final product. Generally, the water content of the soda ash/phosphoric acid reaction mixture will be less than about 28 weight percent and preferably from 12 to 20 weight percent (measured as $H_2O$ loss on heating at 110° C.) If desired, water may be added separately to the first step reaction zone provided the total water content is within the described limits.

The water content of the soda ash/phosphoric acid reaction mixture can be reduced by the method in which the reaction is conducted. For example, when the reactants are initially mixed, a portion of the water is evolved as steam. If this steam is promptly removed from the site of the reaction, a net loss of water is effected.

The progress of the reaction may be monitored by observation of reaction mixture activity as evidenced by gas evolution or temperature. Preferably, the reaction is monitored by withdrawing samples for analysis of residual carbonate. For the purposes of this invention, reaction is considered essentially complete when residual carbonates remaining in the soda ash/phosphoric acid reaction product are analyzed as containing less than three weight percent carbon dioxide (as measured by Chittick volumetric $CO_2$ apparatus). It is desirable that the residual carbonate analysis be as low as possible, preferably less than two weight percent $CO_2$.

The third essential process step reacts the balance of unreacted $H_3PO_4$ and/or $NaH_2PO_4$ from step two with caustic soda. Caustic soda is uniformly mixed with the step two soda ash/phosphoric acid reaction product in an amount sufficient to give a sodium to phosphorus mole ratio of about 1.67 to 1 to the entire reaction mixture. The caustic soda is highly reactive with the unreacted phosphoric acid and uniform mixing of the caustic soda into the second step reaction mixture is generally sufficient to insure reaction. The caustic soda third step reaction is conducted in a semi-solid reaction medium similar to the second step reaction.

The water content of the third step reaction medium may be adjusted in the same manner as the second step reaction. Water vaporized from the exothermic caustic soda reaction may be withdrawn to reduce water content of the reaction mixture. Alternately, water may be added separately to the reaction mixture, particularly if concentrated solid forms of caustic soda are employed. Too dry a mixture will inhibit the uniform mixing necessary to complete the reaction of the phosphoric acid. Too fluid a mixture will necessitate unnecessary drying of the reaction mixture to obtain a desired final product.

A sodium to phosphorus mole ratio of about 1.67 to 1 in the caustic soda reaction product of the third step corresponds to a 2 to 1 mole ratio mixture of disodium hydrogen phosphate to monosodium dihydrogen phosphate. The "about 1.67 to 1" mole ratio of sodium to phosphorus should be from 1.60 to 1.70 to prepare a mixture suitable for conversion to sodium tripolyphosphate.

The progress of the third step reaction may be monitored by withdrawing samples and performing acid/base titrations to determine the amount and proportions of disodium hydrogen phosphate and sodium dihydrogen phosphate.

The third step reaction with caustic soda may be done in the same or different apparatus as used for the reaction between soda ash and phosphoric acid.

The water content of the caustic soda may be adjusted to give a reaction product of the proper consistency. Upon addition of the caustic soda, the reaction mixture should be sufficiently fluid to allow economic and efficient mixing but should not contain excessive water such as would necessitate unnecessary drying of the final product. In general, it is desirable that the final reaction product after caustic soda addition contain less than 28 weight percent and preferably between 12 to 20 weight percent water (measured as water loss on heating at 110° C.).

Temperature, pressure and time are not critical to the soda ash or caustic soda reaction process steps. Generally, these parameters are dictated by convenience of operation in view of the nature of the equipment being used. Typically, the reactants are contacted at approximately ambient temperatures and atmospheric pressure and the reaction is completed in a time period from between 10 minutes to 4 hours.

Caustic soda is typically mixed with soda ash/phosphoric reaction product at temperatures from about 60° to about 105° C. If desired, the caustic soda may be added to soda ash/phosphoric acid reaction product which has been cooled to ambient or near ambient temperatures.

The product formed at the conclusion of the above-described process yields a solid or semi-solid mixture consisting essentially of disodium orthophosphate and monosodium orthophosphate in a 2:1 mole ratio together with water of crystallization and some liquid phase.

The caustic soda final reaction product may be allowed to dry to form a solid or thick semi-solid product. Optionally, this product may be dried in any conventional apparatus such as drum dryers or screen-conveyor dryers to give a solid product.

A further embodiment of the process of this invention is to employ the mixture of orthophosphate produced by the above-described process in an improved method for the production of sodium tripolyphosphate. STPP is formed by tempering and calcining the mixture of orthophosphate salts resulting from the process of this invention, (see, *Comprehensive Inorganic Chemistry*, Vol. 2, Chapter 20, Phosphorus by A. D. F. Toy, pp. 514–515, 1973, Pergamon Press Ltd.).

The process of this invention may be operated in either a batch or continuous system. It is particularly convenient to perform the soda ash/phosphoric acid reaction step and the caustic soda as continuous processes to assure completeness of the reaction.

The invention may be practiced as illustrated in the drawing. A soda ash storage hopper (1) feeds monohydrate processes soda ash to pin mill (3). The milled monohydrate process soda ash travels line (5) to reactor (7) equipped with agitator blades. 85% syrupy phosphoric acid stored in vessel (9) enters via line (11) to reactor (7) to be mixed at the level of 85% stoichiometric reaction proportions with the soda ash arriving via line (5). The soda ash/phosphoric acid reaction product exits reactor (7) as a slurry via line (13) and enters reactor (15). Caustic soda solution (50 wt. % NaOH/50 wt.% $H_2O$) in reservoir (17) is metered via line (19) into reactor (15) simultaneously with the introduction of soda ash/phosphoric acid reaction mixture via line (13) to form a sodium orthophosphate salt mixture having a sodium to phosphorus ratio of 1.67 to 1. The product of reactor (15) exists via line (21) to dryer (23) where it is dried at 110° C. and sent via line (25) to converter (27) for controlled heating at 525° C. Crystalline sodium tripolyphosphate exits as product stream via line (29).

The following examples illustrate various aspects of the process as taught herein:

EXAMPLE I

This example illustrates the effect of soda ash particle size distribution on soda ash reactivity with phosphoric acid. The experimental procedure used in the example is set out below:

A soda ash sample was placed in a 9.5 liter mixer bowl (Hobart mixer Model A-200). With the mixer in operation a dropping funnel suspended above the mixing bowl gradually released a measured quantity of 85% phosphoric acid into the bowl. Total acid addition time varied between two to five minutes. Initially the mixer was operated at slow speed with slow acid addition. The reaction mixture generally became quite hot with accompanying foam, steam and carbon dioxide evolution. Attention was given to the rate of acid addition to prevent foaming of the reaction mixture out of the mixing bowl. Upon completion of the acid addition, the reaction mixture was mixed for an additional 30 minutes. Mixing was actively stopped periodically to scrape the walls of the mixing bowl to encourage uniform reaction.

Samples were taken from the final reaction mixture and analyzed for unreacted sodium carbonate. The unreacted carbonate content was analyzed volumetrically[1] (Chittick apparatus) and the analysis results expressed as percent $CO_2$ based on the sample weight (Wt. % $CO_2 \times 2.41$ = Wt. % $Na_2CO_3$).

Monohydrate process natural soda ash samples coded A, B, C, and D having different particle size distributions as set out below were used in conducting the experiments of this example:

| (A) Monohydrate Process Natural Soda Ash[2]- Assay 99.8 weight percent $Na_2CO_3$ - Code A | |
|---|---|
| Particle Size Distribution | |
| U.S. Standard Sieve | Weight percent |
| plus 20 (0.841 mm. opening) | 0 |
| plus 30 (0.595 mm. opening) | 3 |
| plus 100 (0.149 mm. opening) | 98 |
| minus 100 | 2 |

| (B) Milled Soda Ash[3] - Code B |
|---|
| Particle Size Distribution |

| U.S. Standard Sieve | Weight Percent |
| --- | --- |
| plus 60 (0.250 mm opening) | 2.6 |
| plus 80 (0.177 mm opening) | 5.8 |
| plus 100 (0.149 mm opening) | 8.0 |
| plus 200 (0.074 mm opening) | 16.5 |
| plus 325 (0.044 mm opening) | 23.0 |
| minus 325 | balance |

(C) Milled Soda Ash[3] - Code C
Particle Size Distribution

| U.S. Standard Sieve | Weight Percent |
| --- | --- |
| plus 60 (0.250 mm opening) | 0.4 |
| plus 80 (0.177 mm opening) | 2.5 |
| plus 100 (0.149 mm opening) | 5.1 |
| plus 140 (0.105 mm opening) | 10.2 |
| plus 200 (0.074 mm opening) | 14.6 |
| plus 325 (0.044 mm opening) | 20.4 |
| minus 325 | balance |

(D) Milled Natural Soda Ash[3] - Code D
Particle Size Distribution

| U.S. Standard Sieve | Weight Percent |
| --- | --- |
| plus 325 (0.044 mm opening) | 0.13 |
| minus 325 | balance |

[1]Official Method of Analysis of the Association of Official Agricultural Chemists. William Horwitz, editor published by Association of Official Agricultural Chemists Washington, D.C. pp-119-121, 10th Edition, 1965
[2]Commercial product of the Stauffer Chemical Company.
[3]Derived from milling monohydrate process soda ash - Code A.

Milled and unmilled soda ash samples were reacted with a stoichiometric excess of phosphoric acid based on the equation:

$$5Na_2CO_3 + 6H_3PO_4 \rightarrow 2NaH_2PO_4 + 4Na_2HPO_4 + 5CO_2 + 5H_2O$$

The stoichiometric proportion of different soda ash samples was varied from 70% to 90% to demonstrate the effect of particle size distribution on the completeness of soda ash decomposition.

Experimental results are set out in Table I as follows:

TABLE I

| Test Series | Soda Ash | $Na_2CO_3$ Stoichiometric % | Gms. Soda Ash | Gms. 85% $H_3PO_4$ | % $CO_2$ Residual Ave. of 5 Samples | 95% Confidence Limits of Sample Ave % $CO_2$ |
| --- | --- | --- | --- | --- | --- | --- |
| 10 | A | 70 | 2225 | 4142 | 0.61 | 0.76 to 0.46 |
| 11 | A | 75 | 2385 | 4142 | 1.71 | 1.93 to 1.49 |
| 12 | A | 80 | 2544 | 4142 | 1.95 | 2.30 to 1.60 |
| 13 | A | 85 | 2703 | 4142 | 3.12 | 3.26 to 2.98 |
| 20 | B | 80 | 2544 | 4150 | 0.92 | 1.09 to 0.75 |
| 21 | B | 85 | 2703 | 4150 | 1.22 | 1.36 to 1.08 |
| 22 | B | 90 | 2862 | 4150 | 1.73 | 1.85 to 1.61 |
| 30 | C | 70 | 2225 | 4142 | 0.34 | 0.42 to 0.26 |
| 31 | C | 75 | 2385 | 4142 | 0.55 | 0.79 to 0.31 |
| 32 | C | 80 | 2544 | 4142 | 0.82 | 1.21 to 0.43 |
| 33 | C | 85 | 2703 | 4142 | 1.03 | 1.24 to 0.82 |
| 34 | C | 90 | 2862 | 4142 | 1.35 | 1.74 to 0.96 |
| 40 | D | 75 | 2385 | 4150 | 0.48 | 0.79 to 0.17 |
| 41 | D | 80 | 2544 | 4150 | 0.94 | 1.38 to 0.50 |
| 42* | D | 85 | 2703 | 4150 | 1.07 | 1.68 to 0.46 |
| 43* | D | 90 | 2862 | 4150 | 1.69 | 2.84 to 0.54 |

*Test results based on four samples

The test results show a statistically significant lowering of unreacted soda ash content (measured as weight percent $CO_2$) for the use of milled monohydrate process soda ash samples in comparison with unmilled monohydrate process soda ash.

EXAMPLE II

This example demonstrates the preparation of a mixture containing disodium hydrogen phosphate and monosodium dihydrogen phosphate in a 2:1 mole ratio. Milled soda ash is reacted in less than stoichiometric proportions with phosphoric acid, then sodium hydroxide is reacted with the unreacted phosphoric acid in the reaction product.

Materials

Milled dense soda ash—Code C (described in Example I);

85% phosphoric acid;
50% aqueous sodium hydroxide (by weight);
Hobart Blender Model A-200 with 9.5 liter bowl;
dropping funnel and $CO_2$ analysis (Chittick apparatus) as described in Example I.

Method 2,703 grams of milled monohydrate process soda ash were charged to the bowl of the Hobart mixer and 4,150 grams of 85% phosphoric acid was added over a period of from two to five minutes (85% stoichiometric $Na_2CO_3$). Periodically, the mixing was stopped and the walls and the bottom of the bowl were scraped to prevent build-up of unreacted soda ash. Mixing was continued for 30 minutes. Thereafter, 720 grams of 50% sodium hydroxide was added to the reaction mixture. This produced a boiling hot soupy mix which was mixed for an additional 20 minutes. The final mixture had the appearance of dried-out paste. Five samples were withdrawn from the reaction mixture and analyzed for residual carbonate (measured as weight percent $CO_2$) and sodium/phosphorus ratio. Test results appear in Table II below:

TABLE II

| Sample | % $CO_2$ | Na/P Ratio |
| --- | --- | --- |
| 50 | 0.62 | 1.65 |
| 51 | 0.62 | — |
| 52 | 1.09 | — |
| 53 | .94 | — |
| 54 | .82 | — |
| Average | 0.82 | |

1,000 grams of final product (NaOH added) was dried at 110° C. to a constant weight. A weight loss of approximately 127 grams was observed.

EXAMPLE III

This example demonstrates the reactivity of unmilled Solvay process "light" soda ash with concentrated phosphoric acid.

Materials

Solvay process "light" soda ash (density 559 kg/m³).

| Particle Size Distribution | |
| --- | --- |
| U.S. Standard Sieve | Weight Percent |
| plus 40 (0.420 mm opening) | 2.7 |
| plus 100 (0.149 mm opening) | 30.8 |
| plus 200 (0.074 mm opening) | 43.2 |
| plus 270 (0.053 mm opening) | 15.4 |
| minus 270 | 7.6 |

Method 2,182 grams of 97% by weight (balance $H_2O$) Solvay process "light" soda ash were reacted with 2764 grams of 85% phosphoric acid (stoichiometric proportions by equation I). The experimental procedure was the same as set out in Example I. Test results are shown in Table III as follows:

TABLE III

| Sample | $Na_2CO_3$ Stoichiometric | Wt. % $CO_2$ Residual |
|---|---|---|
| 60 | 100 | 1.04 |
| 61 | 100 | 1.74 |
| 62 | 100 | 1.49 |
| 63 | 100 | 1.09 |
| 64 | 100 | 1.21 |
| | Av. %$CO_2$ | 1.31 |
| | Na/P mole ratio | 1.65 |

The test results demonstrate the higher reactivity of Solvay "light" soda ash in comparison to the monohydrate process natural soda ash employed in Example I.

EXAMPLE IV

This example demonstrates the reactivity of unmilled monohydrate process soda ash used in 100% stoichiometric proportion with concentrated phosphoric acid.

The experimental procedure and apparatus used were as set out in Example I. The soda ash employed was the same as soda ash—Code A described in Example I.

2067 grams of unmilled monohydrate process soda ash were reacted with 2698 grams of 85% phosphoric acid. The reactants were mixed for 30 minutes. Test results are shown in Table IV as follows:

TABLE IV

| Sample | $Na_2CO_3$ Stoichiometric % | Wt. % $CO_2$ Residual |
|---|---|---|
| 70 | 100 | 5.79 |
| 71 | 100 | 4.49 |
| 72 | 100 | 3.94 |
| 73 | 100 | 3.79 |
| 74 | 100 | 4.07 |
| | Average | 4.42 |
| | Na/P Ratio | 1.63 |

What is claimed is:

1. A process for preparing a mixture containing disodium hydrogen phosphate and monosodium dihydrogen phosphate in about a 2:1 mole ratio by the reaction of soda ash with phosphoric acid, wherein the improvement comprises the steps of sequentially:
   (A) Milling monohydrate process soda ash to a particle size distribution such that at least 70 weight percent passes 100 mesh and at least 50 weight percent passes 200 mesh (U.S. Standard Screen Series)
   (B) Reacting in a semi-solid reaction medium the solid milled soda ash of step (A) with concentrated phosphoric acid in such proportion that the soda ash reactant provides between about 74% to about 94% of the stoichiometric sodium carbonate requirements of the reaction represented by the equation:

$$5Na_2CO_3 + 6H_3PO_4 \rightarrow 2NaH_2PO_4 + 4Na_2HPO_4 + 5CO_2 + 5H_2O$$

(C) Uniformly mixing caustic soda with the reaction product of step (B) to yield a product having a sodium to phosphorus mole ratio of about 1.67 to 1.

2. The process of claim 1 wherein the soda ash is milled in step (A) to a particle size distribution such that at least 80 weight percent passes 100 mesh, at least 60 weight percent passes 200 mesh, and at least 15 weight percent passes 325 mesh (U.S. Standard Screen Series).

3. The process of claim 1 wherein the soda ash reactant in step (B) is used to provide between 75% and 90% of the stoichiometric requirements needed for reaction with phosphoric acid.

4. The process of claim 1 wherein the concentrated phosphoric acid has an $H_3PO_4$ content of between about 60 to about 90 weight percent.

5. The process of claim 1 wherein the concentrated phosphoric acid has an $H_3PO_4$ content of between 75 to 87 weight percent.

6. A method for making sodium tripolyphosphate by heating and tempering a mixture of disodium hydrogen phosphate and monosodium dihydrogen phosphate in about a 2:1 mole ratio, wherein the improvement comprises preparing said mixture by a process consisting essentially of the steps of sequentially:
   (A) Milling monohydrate process soda ash to a particle size distribution such that at least 70 weight percent passes 100 mesh and at least 50 weight percent passes 200 mesh (U.S. Standard Screen Series)
   (B) Reacting in a semi-solid reaction medium the solid milled soda ash of step (A) with concentrated phosphoric acid in such proportion that the soda ash reactant provides between about 74% to about 94% of the stoichiometric sodium carbonate requirements of the reaction represented by the equation:

$$5Na_2CO_3 + 6H_3PO_4 \rightarrow 2NaH_2PO_4 + 4Na_2HPO_4 + 5CO_2 + 5H_2O$$

(C) Uniformly mixing caustic soda with the reaction product of step (B) to yield a product having a sodium to phosphorus mole ratio of about 1.67 to 1.

7. The process of claim 6 wherein the soda ash is milled in step (A) to a particle size distribution such that at least 80 weight percent passes 100 mesh, at least 60 weight percent passes 200 mesh, and at least 15 weight percent passes 325 mesh (U.S. Standard Screen Series).

8. The process of claim 6 wherein the soda ash reactant in step (B) is used to provide between 75% and 90% of the stoichiometric requirements needed for reaction with phosphoric acid.

9. The process of claim 6 wherein the concentrated phosphoric acid has an $H_3PO_4$ content of between about 60 to about 90 weight percent.

10. The process of claim 6 wherein the concentrated phosphoric acid has an $H_3PO_4$ content of between 75 to 87 weight percent.

11. The process of claim 1 wherein the caustic soda used in step (C) is in a form selected from the group consisting of; (1) a solid; or (2) an aqueous solution containing 50 to 73 weight percent caustic soda.

12. The process of claim 6 wherein the caustic soda used in step (C) is in a form selected from the group consisting of; (1) a solid; or (2) an aqueous solution containing 50 to 73 weight percent caustic soda.

* * * * *